(12) United States Patent
Morin et al.

(10) Patent No.: US 6,411,927 B1
(45) Date of Patent: Jun. 25, 2002

(54) ROBUST PREPROCESSING SIGNAL EQUALIZATION SYSTEM AND METHOD FOR NORMALIZING TO A TARGET ENVIRONMENT

(75) Inventors: Philippe Morin; Philippe Gelin; Jean-Claude Junqua, all of Santa Barbara, CA (US)

(73) Assignee: Matsushita Electric Corporation of America, Secaucus, NJ (US)

( * ) Notice: Subject to any disclaimer, the term of this patent is extended or adjusted under 35 U.S.C. 154(b) by 0 days.

(21) Appl. No.: 09/148,401

(22) Filed: Sep. 4, 1998

(51) Int. Cl.[7] ............................................. G10L 19/14
(52) U.S. Cl. ....................... 704/224; 704/226; 704/227; 704/225; 704/228; 704/229
(58) Field of Search ................................. 704/224, 226, 704/227, 228, 230, 233, 248, 208, 214, 215, 253

(56) References Cited

U.S. PATENT DOCUMENTS

| | | | |
|---|---|---|---|
| 4,538,295 A | | 8/1985 | Noso et al. |
| 4,630,304 A | * | 12/1986 | Borth et al. ................. 704/226 |
| 4,737,976 A | | 4/1988 | Borth et al. |
| 4,897,878 A | | 1/1990 | Boll et al. |
| 4,918,732 A | | 4/1990 | Gerson et al. |
| 4,933,973 A | | 6/1990 | Porter |
| 4,959,865 A | * | 9/1990 | Stettiner et al. ............. 704/214 |
| 5,012,519 A | * | 4/1991 | Adlersberg et al. ......... 704/233 |
| 5,148,489 A | | 9/1992 | Erell et al. |
| 5,201,004 A | | 4/1993 | Fujiwara et al. |
| 5,212,764 A | | 5/1993 | Ariyoshi |
| 5,251,263 A | * | 10/1993 | Andrea et al. ............... 704/226 |
| 5,267,323 A | | 11/1993 | Kimura |
| 5,353,376 A | | 10/1994 | Oh et al. |
| 5,487,129 A | | 1/1996 | Paiss et al. |
| 5,583,968 A | | 12/1996 | Trompf |
| 5,737,718 A | * | 4/1998 | Tsutsui ....................... 704/205 |
| 5,749,068 A | | 5/1998 | Suzuki |
| 5,758,316 A | * | 5/1998 | Oikawa et al. .............. 704/230 |
| 5,812,970 A | * | 9/1998 | Chan et al. .................. 704/226 |
| 5,819,217 A | * | 10/1998 | Raman ........................ 704/233 |
| 5,826,222 A | * | 10/1998 | Griffin ........................ 704/207 |
| 5,842,162 A | * | 11/1998 | Fineberg ..................... 704/233 |
| 5,878,387 A | * | 3/1999 | Oshikiri et al. ............. 704/207 |

OTHER PUBLICATIONS

Tsoukalas et al., ("Speech Enhancement using Psychoacoustic Criteria", ICASSP'93, Apr. 1993, vol. 2, pp. 359–362).*
Milner et al., ("Comparison of some noise compensation methods for speech recognition in adverse environments", IEE Proceedingd on Vision, Image and Signl Processing, Oct. 1994, vol. 141, No. 5, pp. 280–288).*
Bateman et al., ("Spectral Contrast Normalization and other techniques for speech recognition in noise", ICASSP'92, Mar. 1992, vol. 1, pp. 241–244).*
Hirsch et al., ("Noise estimation techniques for robust speech recognition", ICASSP'95, May 1995, vol. 1, pp. 153–156).*
T. Claes, D.V. Compernolle, "SNR–Normalisation For Robust Speech Recognition", IEEE, pp. 331–334, 1996.

* cited by examiner

*Primary Examiner*—Vijay B Chawan
(74) *Attorney, Agent, or Firm*—Harness, Dickey & Pierce, P.L.C.

(57) ABSTRACT

The audio source is spectrally shaped by filtering in the time domain to approximate or emulate a standardized or target microphone input channel. The background level is adjusted by adding noise to the time domain signal prior to the onset of speech to set a predetermined background noise level based on a predetermined target. The audio source is then monitored in real time and the signal-to-noise ratio is adjusted by adding noise to the time domain signal, in real time, to maintain a signal-to-noise ratio based on a predetermined target value. The normalized audio signal may be applied to both training speech and test speech. The resultant normalization minimizes the mismatch between training and testing and also improves other speech processing functions, such as speech endpoint detection.

16 Claims, 3 Drawing Sheets

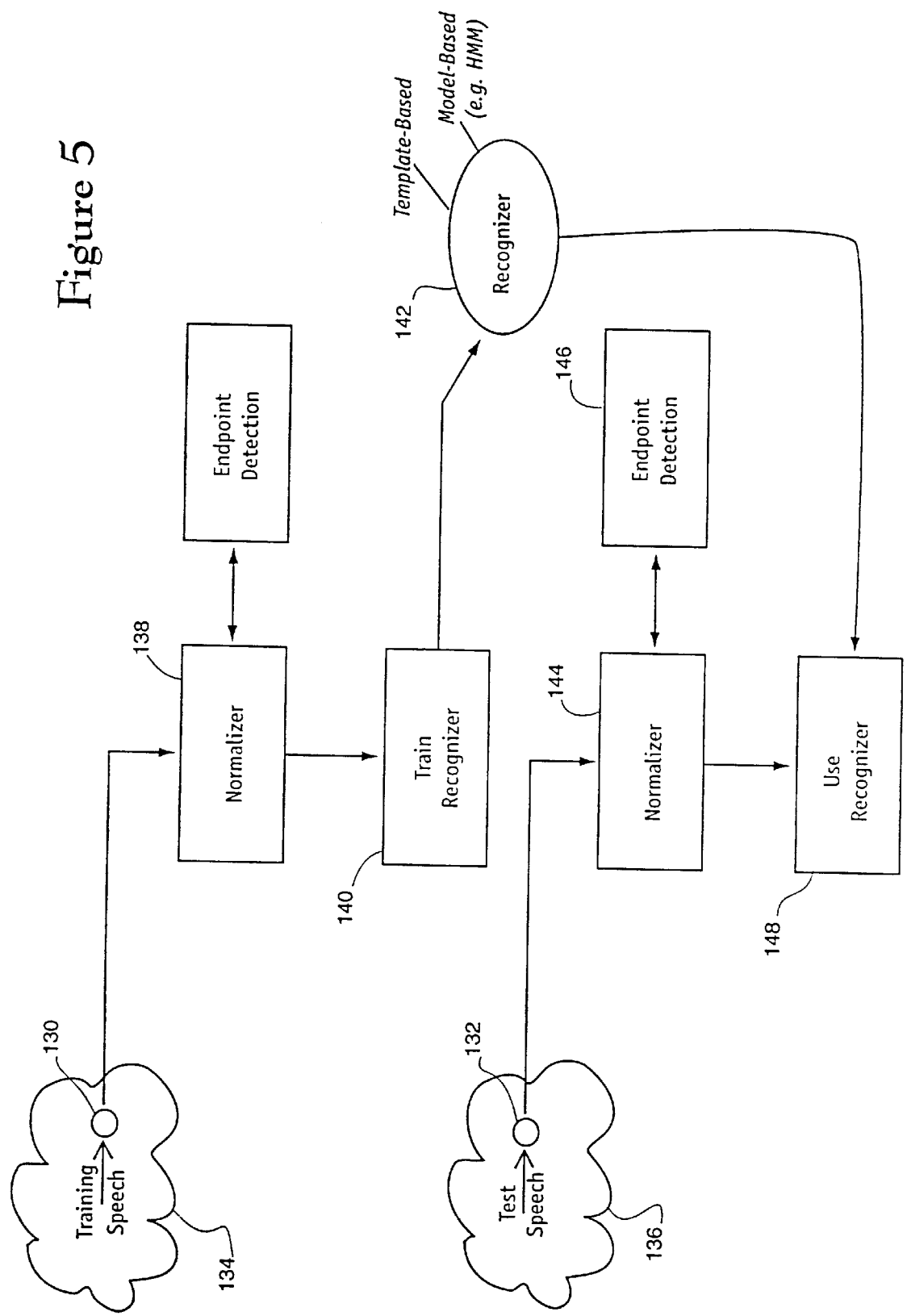

ROBUST PREPROCESSING SIGNAL EQUALIZATION SYSTEM AND METHOD FOR NORMALIZING TO A TARGET ENVIRONMENT

BACKGROUND AND SUMMARY OF THE INVENTION

The present invention relates generally to speech signal processing and speech recognition. More particularly, the invention relates to signal equalization for normalizing a time domain source signal to a target environment, the environment being defined by channel characteristics, background and speaker loudness (SNR).

Many consumer and industrial applications of speech technology encounter adverse conditions that can reduce reliability. Background noise can easily degrade a weak signal, making automatic speech recognition very difficult. Other sources of signal variability also contribute to the problem. For example, variability in microphone response characteristics, room reverberation, speaker variability, distance from microphone, and the like, can easily confound a speech recognizer that has been trained under more favorable conditions. In designing speech-enabled consumer and industrial applications, it is often difficult to take all of these sources of variability into account.

To appreciate the difficulty, consider the significant difference in signal quality between the audio output of a telephone handset and the audio output of a speakerphone. Electro-acoustic differences in the microphone capsules of these respective devices account for some of the difference in quality. However, environmental factors and speaker variability can account for even more. The typical speakerphone will pick up a higher level of background noise as well as reverberation of sounds within the room. Speakerphone users rarely maintain a fixed distance to the microphone, and some users even vary their speaking patterns when using a speakerphone. A system designed to work with both handset and speakerphone will need to address this wide mismatch between these input sources.

While some of sources of variability can be mitigated by careful hardware design, many cannot. In many applications the environment simply cannot be controlled and users' speaking patterns cannot be fully anticipated. A good example is the cellular telephone. Consumers use cellular telephones in a wide range of different environments, including inside moving vehicles where road noise and wind noise is a significant problem. It is very difficult to implement robust speech technology features, such as telephone voice dialing features, in cellular telephone equipment. Other types of mobile systems, such as voice-assisted vehicle navigation systems experience similar problems.

The difficulty of implementing speech technology features in such consumer products is increased by the fact that these products have limited computational resources. Often, there is precious little memory available for storing the complex templates or models needed for robust speech recognition over a wide range of conditions.

To make matters worse, background noise, speaker variability, unstable channel effects and environmental variability degrade many other aspects of the speech system, not just the speech recognizer. For example, many systems employ some form of endpoint detection mechanism, to ascertain when the user has stopped speaking. End-of-speech serves as the "command" to begin processing the input speech. Endpoint detection is difficult; for example, a pause in mid-sentence, or even a weakly articulated word can be mistaken for the end of speech.

Prior attempts to address the problems attendant to background noise and other sources of variability have attempted to compensate for variability by manipulating the speech data in the frequency domain, or by developing large footprint speech models that are trained under a variety of adverse conditions or compensating model parameters at runtime. Such solutions have not proven effective for most consumer applications because they do not adequately address all aspects of speech processing (speech recognition, speech endpoint detection, and the like) and because they often require large amounts of memory or computation.

The present invention provides a preprocessing system and method that normalizes an audio source to one or more predetermined targets, resulting in a robust normalized audio signal in which background noise and other sources of variability are minimized. The system will minimize the mismatch that otherwise occurs between system training and system use. The system and method of the invention operates in the time domain, and in real time, while the system is being used. It may be deployed in the signal processing path upstream of speech recognition and speech detection (endpoint detection) mechanisms. Thus the normalizing effect of the invention can readily benefit all aspects of the speech processing problem.

According to one aspect of the invention, a three phase or three component normalization procedure is performed on the audio source. The audio source is filtered to spectrally shape the time domain signal to match a predefined target channel. This may be accomplished by configuring a filter based on channel parameters selected so that the spectral shape of the channel (including microphone and its attendant acoustic environment where applicable) matches a predefined standard or target channel. The effect of this filtering is to equalize the microphone and its acoustic environment to an appropriately selected standard microphone.

After equalization, the signal level of the audio source is adjusted prior to the onset of speech, to establish a background noise level or noise floor that matches or approaches a predetermined target background noise level. The target background noise level is selected with consideration given to the worst case scenario. In other words, the gain is adjusted so that the noise level prior to the onset of speech approaches the noise level of the worst case expected under noisy conditions.

Having established the background noise compensation value during the pre-speech interval, the system then calculates the noise level required to achieve a target signal-to-noise ratio. In the preferred embodiment this calculation is computed beginning from the onset of speech up to the current frame being processed, until endpoint detection is reached. The system mixes noise with the audio source to approach the target SNR by selecting the greater of the noise compensation value determined during pre-speech and the noise compensation value determined during speech. If the average signal-to-noise ratio is higher than the target value, additional noise is added or mixed with the audio source. If the average signal-to-noise ratio is below the target value no additional noise is added.

The foregoing processing steps may be performed in real time. The result is a normalized audio signal that has been manipulated to have a spectral shape, background noise level and signal-to-noise ratio that match or at least approach the predetermined target conditions. By performing the same normalization process on both training speech (for recognizer training) and on test speech (for recognizer use) the mismatch between training and testing is greatly minimized, resulting in a far more robust product.

For a more complete understanding of the invention, its objects and advantages, refer to the following specification and to the accompanying drawings.

BRIEF DESCRIPTION OF THE DRAWINGS

FIG. 5 is a block diagram illustrating how the normalizer of the invention can be used in a speech system to improve speech recognition and endpoint detection.

DETAILED DESCRIPTION OF THE PREFERRED EMBODIMENT(S)

Figure 1:
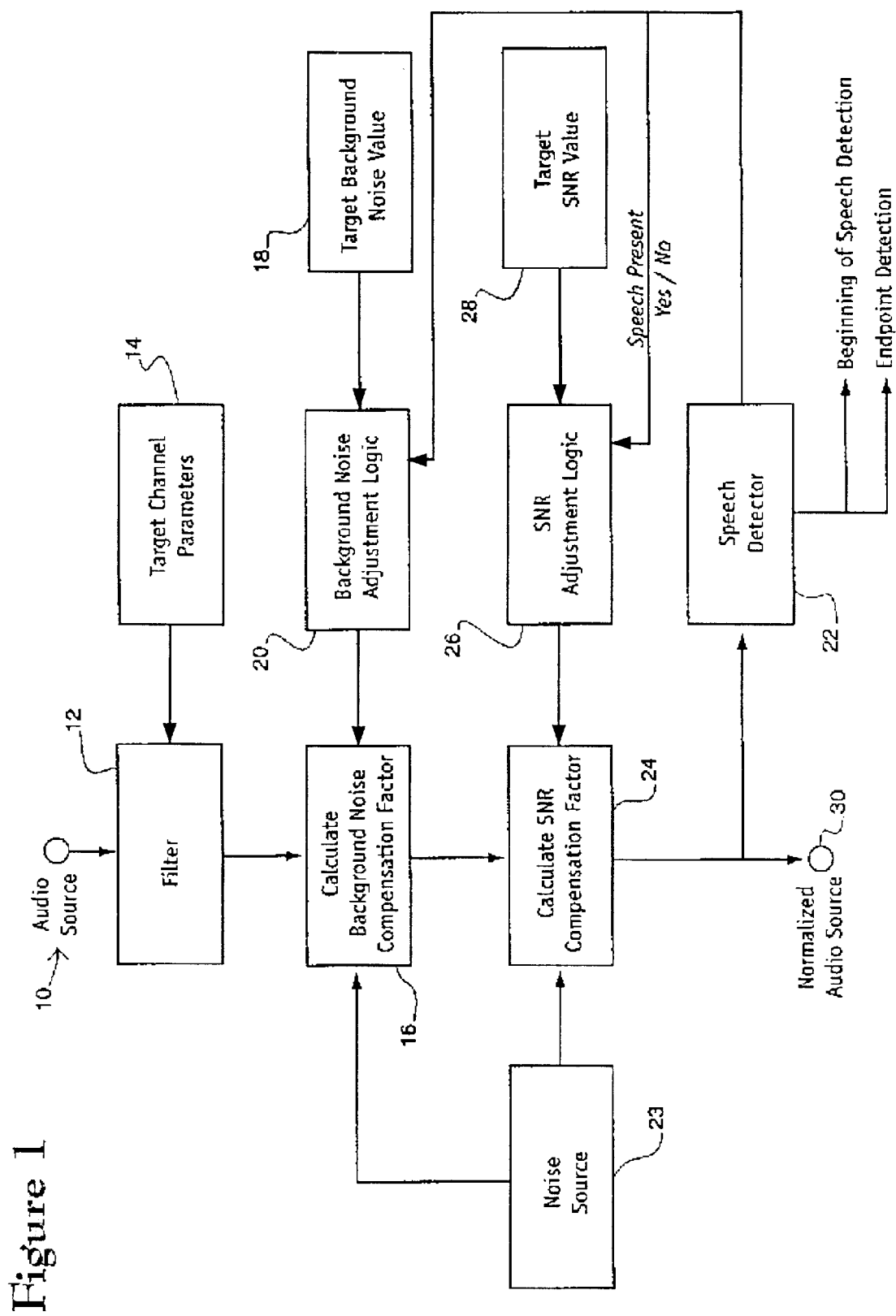
FIG. 1 is a block diagram of a preferred embodiment of the normalizer according to the present invention.

A preferred embodiment of the invention is illustrated in FIG. 1. The embodiment may be implemented in either hardware or software, using either analog or digital signal processing technology.

The audio source 10 is supplied as an input to filter 12. Filter 12 spectrally shapes the audio source, based on target channel parameters that have been represented diagrammatically at 14 in FIG. 1. These target channel parameters take into account the microphone, its associated acoustic environment, and other signal channel effects, producing a resultant audio signal that is equalized in the time domain. Filter 12 may be a digital filter that spectrally shapes the audio source based on the channel parameters 14 provided. Alternatively, filter 12 can be an analog filter having filter parameters that are selected to achieve the desired spectral shaping. In both cases, the filter is configured to manipulate the audio source to mimic or approximate the output of a preselected standardized microphone. Use of filter 12 for spectral shaping is not required in all implementations. For example, where only signal level equization is required, the filter may be omitted.

Figure 2:
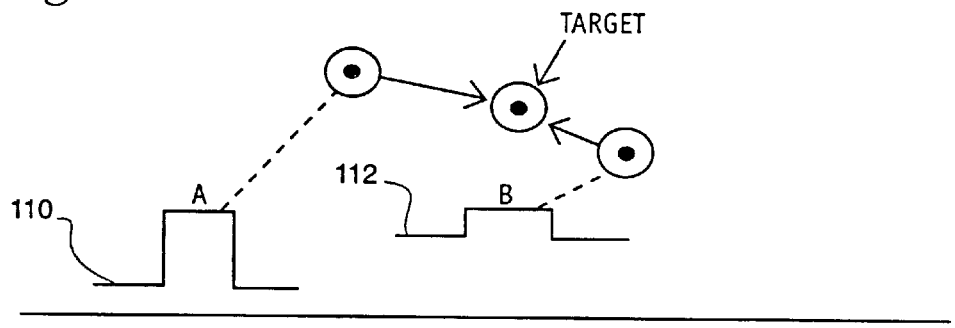
FIG. 2 is a signal normalization diagram illustrating the normalization concept with respect to a single target.

To illustrate this concept, refer to FIG. 2. In FIG. 2 two exemplary channels or microphones, designated A and B have been illustrated in proximate relation to a Target channel or microphone representing the standardized microphone in its standardized environment. In the illustration, microphone B is closer to the Target than is microphone A. The closer proximity of microphone B to the Target microphone is intended to illustrate diagrammatically that the Target microphone is selected so that its spectral properties are more similar to microphone B than they are to microphone A. In an exemplary application, microphone B may be the microphone within the speakerphone of a telephone device, whereas microphone A may be a microphone within the handset of a telephone device. Because the speakerphone represents the more variation-prone input device, the exemplary system is designed so that the Target channel or microphone more nearly resembles this more difficult or "worst case" input device.

The channels A and B do not necessarily have to represent two different types of input devices. They can be the same input device, used at different distances, for example. In an exemplary car phone or car navigation system, channels A and B could represent different types of input devices, such as handheld and hands free devices.

In most systems there is no one "best" Target channel or microphone. The system designer will thus select suitable target channel parameters so that a range of different microphones can be used with the system. This naturally results in selection of a Target microphone that does not out perform any of the microphones that will be encountered in the real world. In other words, if the "worst case" real world microphone has a 6 db per octave roll off at 6 KHz, then the Target microphone should not have a higher frequency response than this. Although the Target microphone may correspond to an actual, real world microphone, this is not a requirement. Rather, the Target microphone can be a virtual microphone defined by suitable frequency response characteristics.

Although the frequency response characteristics of the microphone will, in most cases, represent the primary factor in determining the Target channel parameters, the channel effects of other signal handling components may also need to be taken into account. For example, in a telephone system the bandwidth of the telephone network will also be a consideration in selecting the target channel parameters. The effects of acoustic phenomena, such as room reverberation, can also be minimized by suitable spectral shaping to reduce the resonances.

Returning to FIG. 1, the output of filter 12 is then processed by calculating a background noise compensation factor as at 16. The compensation factor is computed to achieve a pre-speech background noise that equals or at least approaches a predetermined target background noise level as indicated by the following equation:

$$n'=n+\alpha_n b,$$

where n' is the noise floor, b is a noise source, such as noise source 23 and $\alpha_n$ is the background noise compensation factor that determines the minimum noise that will be added to the audio source when speech is subsequently present.

Referring to FIG. 2, the pre-speech noise level of microphone A and of microphone B are indicated graphically at 110 and 112, respectively. Note that the noise floor or background noise level 110 of microphone S is lower than the noise floor or background noise level 112 of microphone B. The Target channel or microphone may thus be modeled by assigning it a background noise value that equals the worst case scenario expected in the real world.

With continued reference to FIG. 1, gain adjustment 16 applies a gain as needed to achieve a predetermined background noise as indicated diagrammatically at 18. The Target background noise value 18 corresponds to the value determined for the Target microphone operating in the expected worst case noise conditions. Background noise adjustment logic determines the required noise level adjustment in real time, based on before-speech signal levels.

The background noise adjustment logic 20 has a mechanism for monitoring the signal level at the gain adjustment point 16 and for distinguishing whether speech is present in the audio signal or not. Background noise adjustment logic 20 may, for example, receive a "speech present" logic signal from a suitable speech detector 22. Speech detector 22 may be the same system used to detect the beginning of speech or the ending of speech (endpoint detection) employed elsewhere in the speech processing system. The preferred embodiment monitors the noise signal level at background noise compensation point 16 and periodically computes an average signal level. The preferred embodiment defines a window comprising a predetermined number of digitally sampled frames (e.g. ten frames) and computes the average noise signal level with each window.

Figure 3:
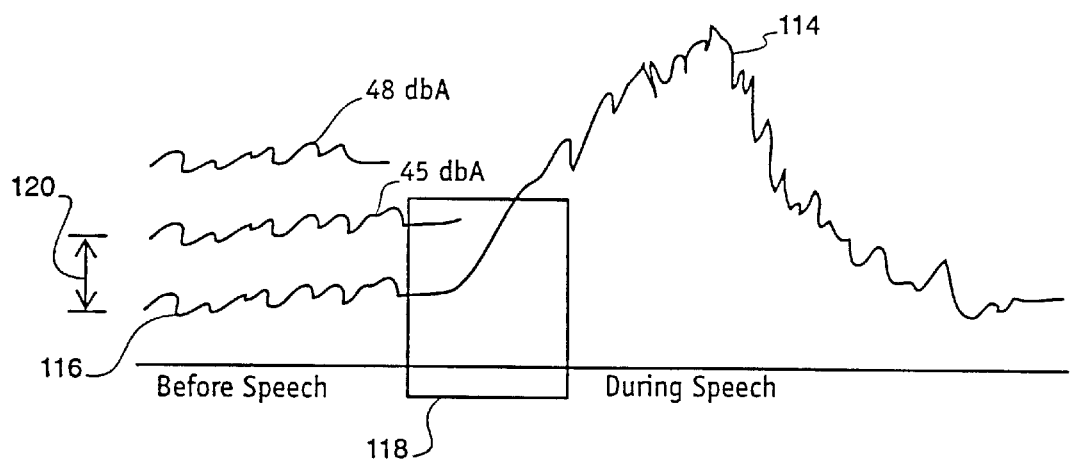
FIG. 3 is an exemplary speech waveform diagram useful in understanding the gain adjustment in accordance with the invention.

To illustrate, refer to FIG. 3 which shows an exemplary speech waveform at 114. The speech waveform 114 is preceded by a non-speech noise signal at 116. The speech detector 22 (FIG. 1) monitors the waveform and detects the onset of speech by the rising waveform illustrated in the speech detection window 118. For illustration purposes, assume that the target background noise value has been established at 45 dbA. In the illustrated waveform of FIG. 3, the pre-speech noise level 116 is below the Target background noise value. An additional noise 120 may be applied to the signal to raise the noise level 116 up to the 45 dbA target value. (In FIG. 3 a still higher noise at 48 dbA is also shown for comparative purposes, in which case no additional noise is added since it is greater than the target.)

Returning to FIG. 1, after the background noise adjustment logic 20 has set the gain adjustment 16 to the appropriate level, this noise amount setting is retained for the duration of the current speech signal. Once endpoint has been detected, the gain adjustment setting can be flushed, allowing the system to establish a new gain setting based on subsequently changing background noise conditions.

Having thus manipulated the audio source to achieve or at least approach the target channel parameters and the target background noise level, the system then further manipulates the audio source to achieve a target signal-to-noise ratio. This is accomplished by selectively mixing a noise source 23 as by noise mixer 24 using signal-to-noise ratio adjustment logic 26. Adjustment logic 26 attempts to achieve a target signal-to-noise ratio value illustrating diagrammatically at 28.

The signal-to-noise ratio adjustment logic 26 may also receive the "speech present" logic signal from speech detector 22. The logic adjustment system monitors the signal level after background noise compensation point 16 and computes a second noise level compensation factor over all frames of the audio source from the onset of speech detection to the current frame. This second noise level compensation factor is based on the following equation:

$$s' = s + \alpha_s b$$

where s' is the resulting signal after noise is added, b is the noise source 23 and $\alpha_s$ is the second compensation factor. The adjustment logic causes noise to be selectively mixed with the source at point 24 to bring the signal-to-noise ratio of the audio source down to the target SNR value if applicable. The signal-to-noise ratio may be computed by taking the log of the ratio between the rms energy of the signal divided by the rms energy of the noise, where the signal energy is determined over all frames from the onset of speech to the current frame and where the noise energy is determined over an n-frame average. The system uses the maximum of the two compensation factors $\alpha$ and $\alpha_s$. The SNR is computed in real time from the beginning of speech to the current frame being processed.

If the signal-to-noise ratio calculated by the adjustment logic 26 is higher than the target value, then additional noise is mixed with the audio signal to bring the SNR down to the target value. If the calculated SNR is already equal to the target value, or if it is below the target value, then no additional noise is injected at the mixer.

The output 30 of noise mixer 24 thus carries a normalized audio signal that has been manipulated to correspond to the predetermined target values, namely, the target channel parameters, the target background noise value, and the target SNR value.

Figure 4:
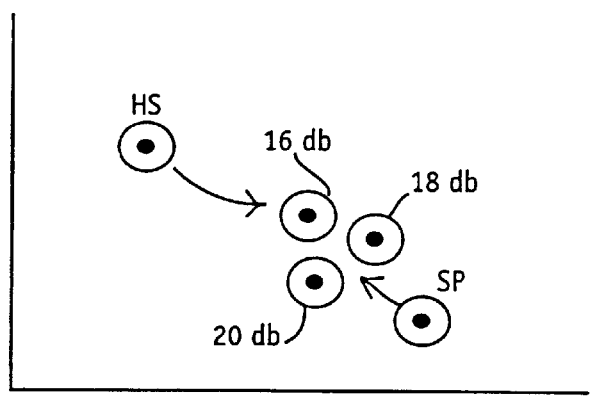
FIG. 4 is a normalization diagram illustrating the normalization concept where several different targets corresponding to different signal-to-noise ratios have been used for multi-style training.

While good results may be achieved using a single target, as illustrated in FIG. 2, the invention can also be implemented using multiple targets to support a multi-style training of the speech recognizer on targets that are close to one another. This is illustrated in FIG. 4. In FIG. 4 three different target microphones have been illustrated. These correspond to different signal-to-noise ratios, in this case 16 db, 18 db and 20 db. The number of targets and their respective SNR values may vary depending on the specific application. Using multiple targets to generate multiple sets of training data and produce even more robust results. Perception of the speech content may differ at different signal-to-noise ratios: some consonants are masked in the presence of noise. By training the recognizer on data processed at different noise levels, the recognizer obtains some information on the variability resulting in useful statistics.

The exemplary normalization system illustrated in FIG. 1 minimizes the mismatch between training and testing. To better understand this, see FIG. 5 which illustrates training speech input at 130 and test speech input at 132. Training speech and test speech functionally differ in this respect. Training speech is used during development of the recognizer. Test speech corresponds to speech of the user of the recognizer after it is constructed. In practical application, training speech and test speech are rarely provided in the same environment. Background noise level, microphone acoustic and electrical properties, speech quality, signal path and other properties may vary widely. Thus, in FIG. 5 the training speech and test speech are diagrammatically represented having been produced in different environments, depicted at 134 and 136, respectively. Because of these many sources of variability, the training speech 130 and the test speech 132 may be slightly or highly mismatched. The normalizer technology of the invention minimizes this mismatch.

As illustrated, the training speech may be processed through the normalizer 138 of the invention and the resultant normalized speech is then used to train the recognizer as indicated at 140. The recognizer 142 can be based on a variety of different recognition technologies, including template-based technologies and model-based technologies, such as Hidden Markov Model (HMM) technology.

In a similar fashion, the test speech 132 can be processed through the normalizer technology of the invention, as illustrated at 144. The resultant normalized speech can then be used for endpoint detection as illustrated at 146 or by the recognizer 142 as illustrated at 148. Endpoint detection can be placed before the normalization process or within it (between channel filtering/background equalization and SNR equalization). When placed within, the results typically provide a more consistent input stream to the endpoint detector.

Whereas as the training speech 130 and test speech 132 are likely to be highly mismatched, due to their different environments and sources of variability, the normalized training speech and normalized test speech are far less mismatched. Thus the recognizer 142 has a far less difficult task than if the original training speech and test speech been used. Similarly, the endpoint detection system 146 will also operate more easily because normalization of the test speech tends to reduce fluctuations that might be mistaken as end-of-speech conditions.

While the invention has been illustrated in an exemplary preferred embodiment, it will be understood that the principles of the invention can be applied in a variety of different situations. Accordingly, the invention is capable of certain modification and change without departing from the spirit of the invention as set forth in the appended claims.

What is claimed is:

1. A signal normalizer for processing an audio source comprising:
   a speech signal detector receptive of said audio source for detecting when speech is present and is not present in said audio source;
   a first compensation factor calculation module responsive to said speech signal detector for determining a first noise quantity and adding noise to said audio source when speech is not present in said audio source, to set the background noise level in accordance with predetermined target parameters;
   a second compensation factor calculation module responsive to said speech signal detector for determining a second noise quantity for selectively adding noise to said audio source when speech is present in said audio source, to set a predetermined signal-to-noise ratio in accordance with said predetermined target parameters.

2. The signal normalizer of claim 1 further comprising a filter receptive of said audio source for spectrally shaping said audio source in accordance with predetermined target parameters.

3. The signal normalizer of claim 2 wherein said audio source is a time domain signal and wherein said filter operates on said audio source in the time domain.

4. The signal normalizer of claim 2 wherein said filter is implemented by digital process.

5. The signal normalizer of claim 2 wherein said filter is implemented by analog process.

6. The signal normalizer of claim 1 wherein said target parameters include channel parameters based on electro-acoustic properties of a predetermined audio channel.

7. The signal normalizer of claim 1 wherein said target parameters include channel parameters based on electro-acoustic properties of a predetermined microphone.

8. The signal normalizer of claim 1 wherein said target parameters include background noise value corresponding to a predetermined noise level.

9. The signal normalizer of claim 1 wherein said target parameters include signal-to-noise ratio value corresponding to a predetermined signal-to-noise ratio.

10. The signal normalizer of claim 1 wherein said speech signal detector comprises a speech endpoint detector.

11. A speech recognition system, the system comprising:
    a speech recognizer of the type that is trained upon a predetermined corpus of training speech generated in a training environment and used by matching patterns in an utterance of test speech generated in a use environment; and
    a normalizer for processing said training speech and said test speech by adding predetermined quantities of noise to said training speech and said test speech to minimize mismatch between said training and use environments.

12. The system of claim 11 wherein said normalizer processes said training speech and said test speech in the time domain.

13. The system of claim 11 wherein said training speech and said test speech is supplied through an audio source and wherein said normalizer comprises:
    a speech signal detector receptive of said audio for detecting when speech is present and is not present in said audio source;
    a first compensation factor calculation module responsive to said speech signal detector for determining a first noise quantity for applying to said audio source when speech is not present in said audio source, to establish a predetermined background noise level in accordance with predetermined target parameters;
    a second compensation factor calculation module responsive to said speech signal detector for determining a second noise quantity for selectively applying to said audio source when speech is present in said audio source, to establish a predetermined signal-to-noise ratio in accordance with said predetermined target parameters.

14. The system of claim 11 wherein said normalizer modifies said training speech and said test speech such that each approach a common target characterized by predetermined target channel parameters, background noise and signal-to-noise ratio.

15. The system of claim 11 wherein said normalizer modifies said training speech based on a plurality of targets, each target characterized by predetermined target channel parameters, background noise and signal-to-noise ratio.

16. The system of claim 13, wherein said normalizer further comprises a filter receptive of said audio source for spectrally shaping said audio source in accordance with said predetermined target parameters.

* * * * *